Nov. 21, 1939.  C. W. SINCLAIR  2,181,028
METHOD OF MAKING VEHICLE WHEEL BODIES
Filed Aug. 10, 1936   2 Sheets-Sheet 1
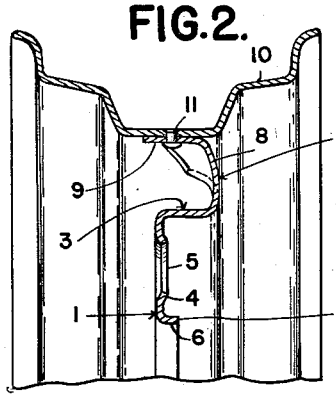
FIG.2.
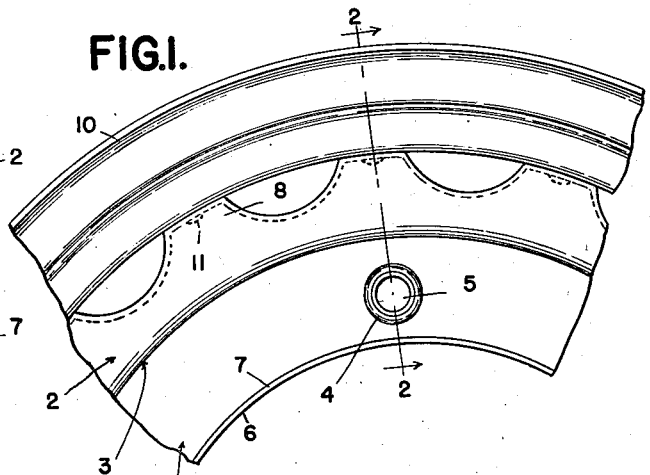
FIG.I.
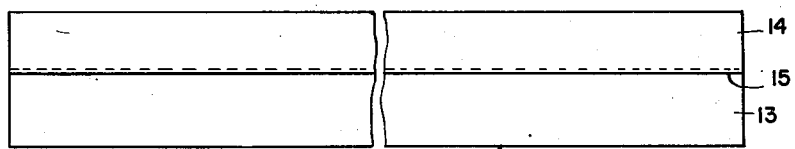
FIG.3.
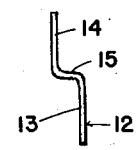
FIG.4.
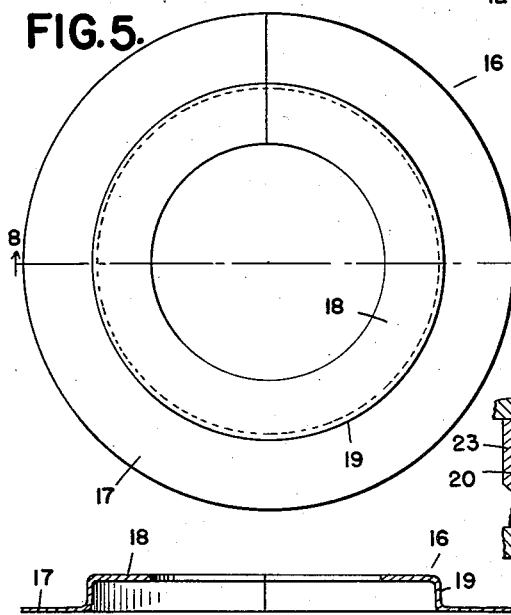
FIG.5.
FIG.8.
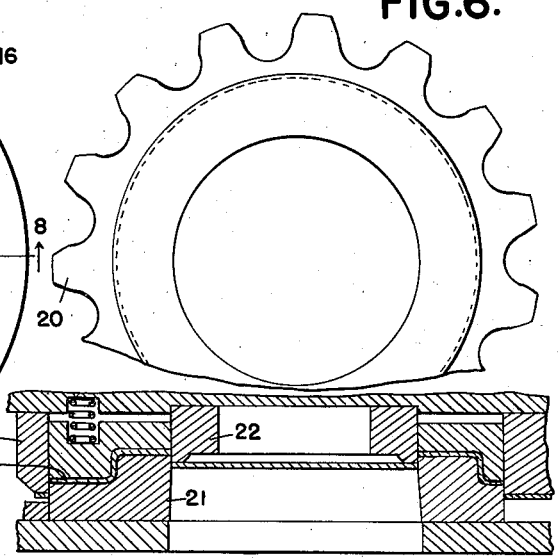
FIG.6.
FIG.9.
INVENTOR
CHARLES W. SINCLAIR
BY
ATTORNEYS Nov. 21, 1939.         C. W. SINCLAIR         2,181,028
METHOD OF MAKING VEHICLE WHEEL BODIES
Filed Aug. 10, 1936         2 Sheets-Sheet 2

*INVENTOR*
CHARLES W. SINCLAIR
BY
*ATTORNEYS*

Patented Nov. 21, 1939

2,181,028

UNITED STATES PATENT OFFICE 2,181,028

METHOD OF MAKING VEHICLE WHEEL BODIES

Charles W. Sinclair, Detroit, Mich., assignor to Kelsey-Hayes Wheel Company, Detroit, Mich., a corporation of Delaware Application August 10, 1936, Serial No. 95,226

3 Claims. (Cl. 29—159.03)

The invention relates to the manufacture of wheel bodies and refers more particularly to the method of making spoked wheel bodies for motor vehicles.

One of the objects of the invention is to provide an improved method of making a wheel body in such a manner that there is very little loss of material, or scrap. Another object is to make a wheel body having inner and outer axially offset portions from a generally Z-shaped blank. Further objects are to make this wheel body with its inner and outer portions tapered in section and to form spokes in the outer portion after it has been tapered in section.

These and other objects of the invention will appear as more fully hereinafter set forth.

In the drawings:

Figure 1 is an outboard elevation of a wheel body showing an embodiment of my invention;

Figure 2 is a cross section on the line 2—2 of Figure 1;

Figure 3 is a plan view of a blank from which the wheel body is made;

Figure 4 is an end view of the blank of Figure 3;

Figures 5, 6 and 7 are elevations illustrating the blank after certain steps in the method have been performed;

Figure 8 is a cross section on the line 8—8 of Figure 5;

Figures 9 and 10 are sectional views illustrating the manner of forming the blanks of Figures 6 and 7 respectively;

Figure 7:
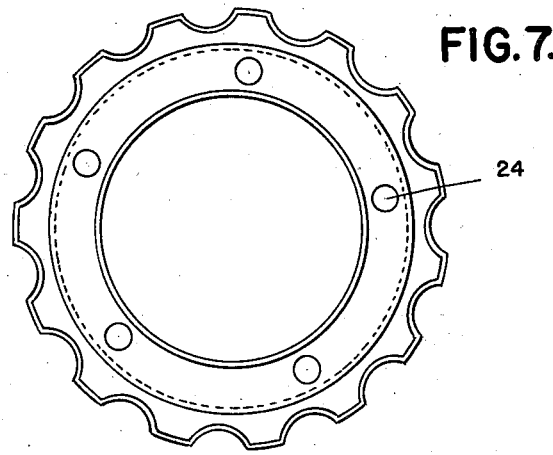

As illustrated in Figures 1 and 2, the vehicle wheel body is formed of sheet metal and has the inner portion 1, the outer portion 2 and the annular portion 3 connecting the inner and outer portions. The inner and outer portions are axially offset and the annular portion extends axially therebetween and is integral therewith. Both the inner and outer portions extend substantially radially and the inner portion is the bolting-on flange of the wheel body and is provided with the annular series of bosses 4 each of which has the axial hole 5 through which may extend bolts or other suitable means used in securing the wheel body to the wheel hub. The inner portion has the central opening 6 therethrough for sleeving over the wheel hub and the aperture of this opening is preferably formed by the annular flange 7 which serves to pilot the wheel body upon the hub during the mounting. The outer portion 2, as shown, is formed with the angularly spaced radially extending spokes 8 which are of channel section and open rearwardly and each have their outer ends closed by the integral flanges 9. These flanges are adapted for securement to the tire carrying rim 10 by suitable means, such as the rivets 11, which pass through the base of the well of the rim and the flanges.

Figure 12:
Figure 12 is a cross sectional view of the original strip from which the blank illustrated in Figure 3 is formed.

In the manufacture of this vehicle wheel body, a strip of sheet metal stock of generally Z-shaped section is cut to length to produce the blank 12 shown in Figures 3 and 4. The strip of stock shown in Figures 3 and 4 may be and preferably is formed from an original sheet metal strip A shown in Figure 12 as having a width sufficient to form two generally Z-shaped strips, the original strip after the forming being acted upon to sever the generally Z-shaped strips from each other. The blank 12 has the flanges 13 and 14 located in substantially parallel planes and the connecting web 15 which, as shown, extends substantially at right angles to the flanges.

The blank 12 is then hooped or coiled and its adjacent ends are welded, after which the weld flash is trimmed, Figures 5 and 8 illustrating the hooped or annular blank 16 resulting from these steps. The hooping or coiling is about the web 15 of the blank 12 as a neutral axis and the flanges 13 and 14 of the blank 12 become the outer and inner flanges 17 and 18 respectively of the annular blank 16, these flanges remaining in their respective planes. The hooping or coiling is effected in a suitable rolling machine and during the step the flange 17 is progressively stretched toward its outer edge and the flange 18 is progressively upset toward its inner edge. As a result, the flange 17 progressively tapers in section from the web 19 of the blank 16 to its outer edge, while the flange 18 progressively increases in section from the web 19 to its inner edge. It will be noted that the web 19, which is annular and also substantially cylindrical, has substantially the same gauge as the web 15.

After the annular blank 16 has been formed, the inner edge of the inner flange is trimmed and the outer flange is notched in angularly spaced zones, leaving angularly spaced spoke parts 20, the apparatus for accomplishing this work being illustrated in Figure 9 and the blank made by this apparatus being illustrated in Figure 6. The trimming and notching are accomplished by means of the die 21 and the cooperating inner and outer dies 22 and 23, respectively. It will be noted that during these steps the inner and outer flanges are substantially at right angles to the axis of the blank.

Figure 10:
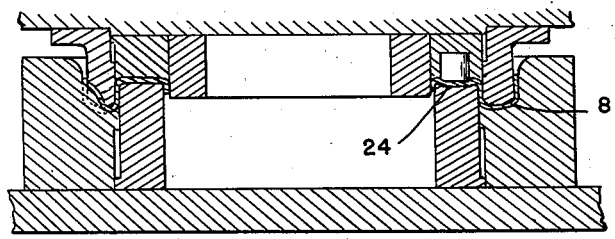

The blank is then operated upon by the apparatus illustrated in Figure 10 which fashions the spoke parts 20 into the spokes 8 of channel section having their outer ends integrally closed by the flanges 9. This apparatus also forms the bosses 24 in the inner flange of the blank and further forms the annular flange 7 at the inner edge of this inner flange. The blank at this time has the appearance as shown in Figure 7.

Figure 11:
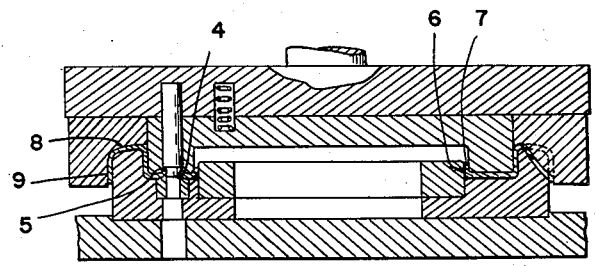
Figure 11 is a sectional view illustrating the final forming of the wheel body.

The blank is then operated upon by the apparatus shown in Figure 11, which restrikes the blank completing the formation of the bosses 24 into the bosses 4 and also truing up the blank, and further piercing the bosses 4 to form the axial holes 5. The blank at this time is the wheel body shown in Figures 1 and 2.

What I claim as my invention is:

1. The method of forming a sheet metal wheel body which comprises hooping a generally Z-shaped blank about its web as a neutral axis and during the hooping increasing the gauge of the flange radially inwardly of the web toward the inner edge of the flange and decreasing the gauge of the flange radially outwardly of the web toward the outer edge of the last mentioned flange, securing the ends of the hooped blank to each other, and forming the radially outwardly extending flange to provide spoke portions.

2. The method of forming a wheel body which comprises hooping a generally Z-shaped blank into an annular blank with axially offset flanges and also with an annular portion connecting the flanges, securing the ends of the annular blank to each other, notching one of the flanges in angularly spaced zones, fashioning the parts between the notches into spokes, and forming the other flange into a bolting-on portion.

3. The method of forming a sheet metal wheel body which comprises hooping a generally Z-shaped blank about its web as a neutral axis to provide an annulus, securing the ends of the annulus together, notching the radially outwardly extending flange of the annulus to provide angularly spaced spoke portions, fashioning said spoke portions to a predetermined contour, and fashioning the inwardly extending portion of the annulus to provide a bolting-on flange.

CHARLES W. SINCLAIR.